(12) United States Patent
Kaukler

(10) Patent No.: US 9,695,525 B1
(45) Date of Patent: Jul. 4, 2017

(54) METHODS AND SYSTEMS FOR MAKING CARBON FIBERS FOR HIGH TEMPERATURE APPLICATIONS

(71) Applicant: William Felix Kaukler, Huntsville, AL (US)

(72) Inventor: William Felix Kaukler, Huntsville, AL (US)

(73) Assignee: The Board of Trustees of the University of Alabama, for and on behalf of the University of Alabama in Huntsville, Huntsville, AL (US)

( * ) Notice: Subject to any disclaimer, the term of this patent is extended or adjusted under 35 U.S.C. 154(b) by 4 days.

(21) Appl. No.: 14/498,754

(22) Filed: Sep. 26, 2014

Related U.S. Application Data

(60) Provisional application No. 61/883,012, filed on Jun. 10, 2013.

(51) Int. Cl.
| | | |
|---|---|---|
| *D01D 1/02* | (2006.01) | |
| *D01D 1/10* | (2006.01) | |
| *D01D 5/06* | (2006.01) | |
| *D01D 10/06* | (2006.01) | |
| *D01D 10/02* | (2006.01) | |
| *B29C 37/00* | (2006.01) | |

(52) U.S. Cl.
CPC .......... *D01D 10/02* (2013.01); *B29C 37/006* (2013.01); *D01D 1/103* (2013.01)

(58) Field of Classification Search
CPC .......... B29C 37/006; D01D 1/02; D01D 1/10; D01D 1/103; D01D 5/06; D01D 10/02; D01D 10/06; D01F 2/00; D01F 2/02; D01F 2/24; D01F 2/28; D01F 9/16

USPC .......... 264/29.2, 29.7, 101, 102, 178 F, 187, 264/188, 189, 203, 211.14, 211.15, 264/211.16, 232, 233; 423/447.1, 447.4, 423/447.8
See application file for complete search history.

(56) References Cited

U.S. PATENT DOCUMENTS

| | | | | |
|---|---|---|---|---|
| 2009/0227975 | A1* | 9/2009 | Dougherty, Jr. | ........ A61F 13/20 604/367 |
| 2010/0256352 | A1* | 10/2010 | Uerdingen | ................ D01F 2/02 536/56 |
| 2014/0194603 | A1* | 7/2014 | Lehmann | ................ D01D 5/06 530/502 |

* cited by examiner

*Primary Examiner* — Leo B Tentoni
(74) *Attorney, Agent, or Firm* — Maynard Cooper & Gale, P.C.; Jon E. Holland

(57) ABSTRACT

The present invention relates to a method for the continuous production of low thermal conductivity endless filament yarns with a compact, homogeneous structural morphology. The presently disclosed methods utilize safe and recyclable ionic liquids (IL) to produce carbon fiber precursors from cellulose. The fibers are produced by the carbonization of cellulose carbon fiber precursors. The precursor fiber filaments have an increased tear resistance with simultaneously sufficient elongation, a round or crenulated cross-section, and homogeneous fiber morphology. The filament yarns exhibit performance characteristics similar to those produced from traditional viscous rayon. The resulting fibers are especially suited for aerospace applications in composite materials used at the limits of high temperatures, for instance in structures found in rocket nozzles or atmospheric reentry heat shields on spacecraft.

10 Claims, 6 Drawing Sheets

METHODS AND SYSTEMS FOR MAKING CARBON FIBERS FOR HIGH TEMPERATURE APPLICATIONS

CROSS REFERENCE TO RELATED APPLICATION

This application claims priority to U.S. Provisional Patent Application No. 61/883,012, entitled "Carbonization of Rayon Fingers for a Heat Shield" and filed on Sep. 26, 2013, which is incorporated herein by reference.

STATEMENT REGARDING FEDERALLY SPONSORED RESEARCH OR DEVELOPMENT

This invention was made with Government support under W31P4Q-10-D-0092 awarded by the Department of Defense. The Government has certain rights in the invention.

RELATED ART

A thermal soak heat shield is a device which absorbs and radiates heat away from a spacecraft structure. Generally, this type of heat shield utilizes ceramic or composite tiles located over the vehicle surface. Reinforced carbon fiber material is placed on the highest heat load points, for instance the nose leading edges or the rocket nozzle of the space shuttle. Traditionally, the carbon fibers are constructed from a viscous rayon precursor. Cellulosic fibers, such as rayon, are easily pyrolysed into an amorphous carbon structured fiber useful in the construction of heat shields. The low thermal conductivity of the cellulosic carbon fiber makes it an excellent candidate for thermal protection systems. When used as the reinforcing fiber in rocket nozzle construction, cellulosic precursor carbon fibers offer the lowest recession rates.

A traditional method of manufacturing viscose rayon involves the use of caustic chemicals. This method utilizes wood (cellulose and lignin) as a source of cellulose and results in the production of toxic waste products, such as carbon disulfide, lignin and the xanthates. The Environmental Protection Agency has implemented regulations which make the production of viscous rayon cost prohibitive. As a result rayon is no longer commercially produced in the United States. NASA and the Department of Defense stockpiled millions of pounds of viscose rayon for rocket nozzle construction in the early 1990s in anticipation of these environmental regulations. These stockpiles are now nearly depleted.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure relates to methods and systems for the continuous production of cellulosic filament yarns with a compact, homogeneous structural morphology, and the low thermal conductivity carbon fibers produced by these methods. The disclosed methods utilize safe and recyclable ionic liquids (IL) to produce carbon fiber precursors from cellulose. In one embodiment, the fibers are produced by the carbonization of cellulose carbon fiber precursors. The filament yarns are critical components of high temperature applications, such as rocket nozzles for solid rocket motors and composite reinforcement in ablative heat shields. The fibers are manufactured from cellulose solutions in ionic fluids as part of a wet spinning process. The processing of the cellulose at near room temperature preserves the necessary degree of polymerization. The precursor fiber filaments have an increased tear resistance with simultaneously sufficient elongation, a round or crenulated cross-section, and homogeneous fiber morphology. The filament yarns exhibit performance characteristics similar to those produced from traditional viscous rayon. The resulting carbon fibers are especially suited for aerospace applications in composite materials used at high temperatures, for instance in structures found in rocket nozzles or atmospheric reentry heat shields on spacecraft.

Figure 1:
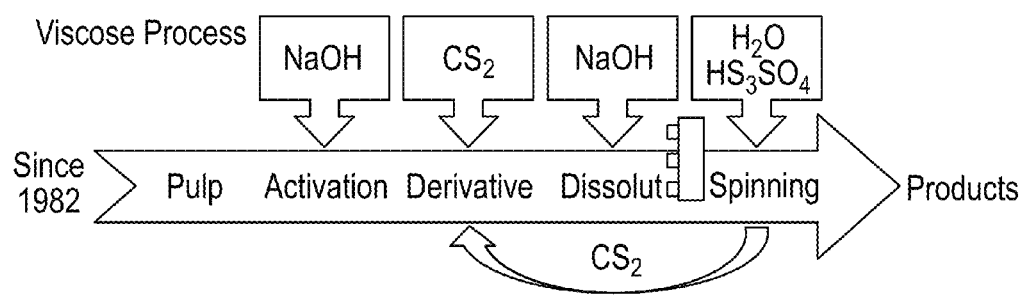
FIG. 1 an illustration of a method of producing carbon fibers using a viscous rayon precursor.

A traditional method of producing viscous rayon precursor fibers is illustrated in FIG. 1A. This process includes the use of high concentrations of toxic chemicals such as sodium hydroxide, carbon disulfide and sulfuric acid. These chemicals produce large quantities of toxic byproducts which can contaminate the water supply and are harmful to humans.

In contrast, the methods of this disclosure avoid the use of harmful chemicals and instead include dissolving the cellulose in an ionic liquid (IL). Cellulose, an organic compound with the formula $(C_6H_{10}O_5)_n$, is a polysaccharide consisting of a linear chain of several hundred to many thousands of $\beta(1\rightarrow4)$ linked D-glucose units. Cellulose is an important structural component of the primary cell wall of green plants and many forms of algae. With respect to the production of filament or textile yarns described in the present disclosure, the source of cellulose may be, for example, cotton, linen, and/or other plant fibers. In one embodiment, the cellulose is cotton linters (from the base of the cotton ball). Other sources of cellulose are possible in other embodiments. In one embodiment, the cellulose is in powder form.

Ionic liquids are strong solvents, have high decomposition temperatures and have very low volatility. The ionic liquids described herein are organic compounds that may be referred to here as "room temperature ionic liquids". One example of a room temperature ionic liquid is 1-butyl 3-methylimidazolium chloride (Bmim Cl). This fluid has a melting point of only 65° C. and is a liquid at room temperature. The Bmim ion is large and this causes the delocalization of the electrostatic charges and thus weakens the ionic bond strength of the solution, which lowering the melting point. In an additional embodiment, the ionic liquid comprises 1-ethyl 3-methylimidazolium acetate (Emim OAc) with at least 90% purity.

Figure 2:
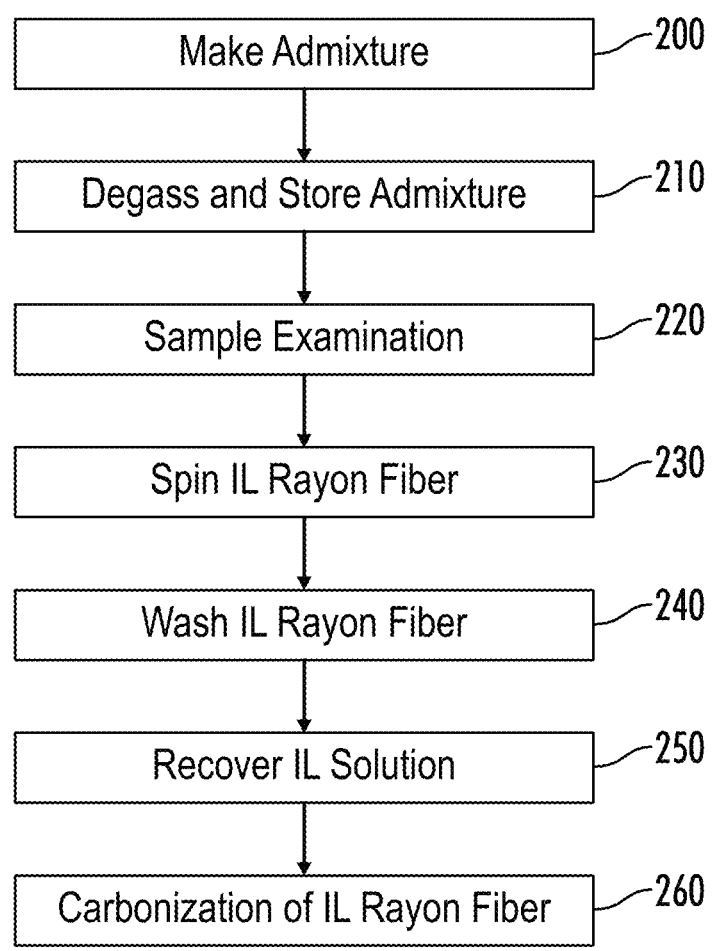
FIG. 2 shows a first exemplary flowchart of a method for producing carbon fibers for high temperature applications.

FIG. 2 shows an exemplary flowchart of a method for producing carbon fiber filaments for use in high temperature applications. In block 200, the cellulose is dissolved in the ionic liquid, producing a solution hereinafter referred to as an "admixture". Traditionally, methods of dissolving high concentrations of cellulose in a solution required the use of caustic chemicals, high temperature, and high pressure. The caustic chemicals caused derivitization of the cellulose and a concurrent detrimental reduction of the molecular weight of the polymerized cellulose molecules. The ionic liquids of the present disclosure dissolve the cellulose material with little or no derivitization, thus preserving the high molecular weight of the polymer and providing increased strength of the resulting cellulosic/rayon fibers.

In one embodiment, the cellulose feed stock comprises cotton linters that comprise nearly pure cellulose with a degree of polymerization (DP) exceeding 1000. The resulting admixture contains between 2.4 and 8% w/v cellulose. Other concentrations of cellulose are possible in other embodiments. In an additional embodiment, the admixture contains 5% w/v cellulose, which provides a solution with an advantageous balance of viscosity, mixability and fiber strength. In an exemplary embodiment, the ionic liquid comprises Emim Oac with a minimum purity of 90%. Any impurities present in the ionic liquid have little affinity for the cellulose and are removed from the admixture during the subsequent wash steps. The solubility of the cellulose and the solution properties can be controlled by the ionic liquid constituents.

Referring again to block 200 of FIG. 2, this step comprises admixing the cellulose with a suitable hydrophilic ionic liquid and agitating to form a solution. In one embodiment, the admixture is heated to a temperature from between 50° C. to 100° C. to increase the dissolution rate and reduce the viscosity, although other temperature ranges may be possible in other embodiments. In one embodiment, a temporary increase of the heating temperature to 120° C. may aid in mixing. A temporary increase in the temperature of the solution aids the stirring motion to introduce adequate shear to break up the cellulose clumps and ensure contact between the cellulose particles and the liquid. In addition, the elevated temperatures prevent adsorption of moisture from the air. Trapped air spaces between the fibers allow atmospheric moisture to enter the solution. In one embodiment, a motorized stirring paddle may be employed as it imparts enough shear force to enhance dissolution.

In one embodiment, the temperature of the cellulose/ionic liquid solution is maintained at a specified range during the mixing process. This may be accomplished, for example, with a heating blanket, oil bath or periodic pulsed heating in a microwave oven. In one exemplary embodiment, the heated admixture is mixed for a minimum of one hour, where it is then transferred to a vacuum oven with a temperature from between 85° C. to 100° C., although other temperature ranges may be possible in other embodiments. In one embodiment, a temporary increase of the heating temperature to 120° C. may aid in mixing. The ionic liquid absorbs microwaves well, allowed mixing times to be reduced to less than an hour. Microwave energy enhances the dissolution rate by 2-10× not just because of the temperature rise but because of the improved kinetics from molecular motion on the molecular scale.

In this exemplary embodiment, it is critical that the temperature of the admixture not exceed approximately 200° C. as this will cause burning of the cellulose. The use of a microwave oven requires close monitoring of the solution temperature as thin films of solution can form on the walls of the vessel container. Overheating may cause deterioration of the cellulose, also referred to as derivitization or decomposition. Detrimental derivitization occurs in two situations: (1) decomposition of the cellulose molecules to form glucose molecules, as evidenced by the appearance of a caramel color and an odor of burning paper or sugar; and (2) the reduction of the cellulose molecular weight (without decomposing the cellulose molecules to non-cellulose components like glucose) from approximately 1000-3000 DP to approximately 200-300 DP (DP degree of polymerization is similar to polymer molecular weight). The strength of the rayon fiber is a result of the high molecular weight of the cellulose polymer. In one embodiment, the temperature of the vessel is maintained below 100 C to avoid derivitization of the ionic liquid. The ionic liquids of the present disclosure will not cause derivitization for at least three months after creation of the admixture. In one embodiment, the cellulose feedstock is added to the ionic liquid gradually and stirring continues until the resulting solution is completely clear. Any undissolved cellulose particles will interfere with the production of the carbon fibers.

Referring again to FIG. 2, the ionic liquid/cellulose mixture is degassed and stored, as indicated at block 210. In this embodiment, the admixture solution is placed into a vacuum oven where it is degassed and then stored to ensure full dissolution. The storage is conducted at temperatures from between 85° C. and 95° C. for at least two days. Other temperature ranges may be possible in other embodiments. In addition, the length of storage may differ in other embodiments. Storage in these conditions allows for the removal of all traces of water. Block 230 includes the step of examining the solution to ensure that here are no in undissolved cellulose particles. This examination may be performed, for instance, with a microscope. Even microscopically sized cellulose particles will affect the performance of the precursor rayon fiber, and ultimately the final carbon fiber.

Block 230 of FIG. 2 represents the step of spinning the cellulosic precursor fibers to form a rayon fiber, referred herein as "IL rayon". The spinning process as described in this embodiment is normally referred to as wet spinning as the spinerette extrudes the cellulose solution directly into a liquid, for example water. The spinerette may be constructed from a metal disk, for instance a stainless steel disk, with precisely formed microscopic holes. In one embodiment, these holes have a diameter of between 50 and 127 micrometers, although holes with other diameters are possible in other embodiments. In an additional embodiment, the spinerette contains from between 10 and 500 holes. In an additional embodiment with reference to block 230 of FIG. 2, the spinerette contains from between 10 and 500 holes. As a result, multiple IL rayon fibers are spun in parallel, each exhibiting similar chemical properties.

Figure 5A:
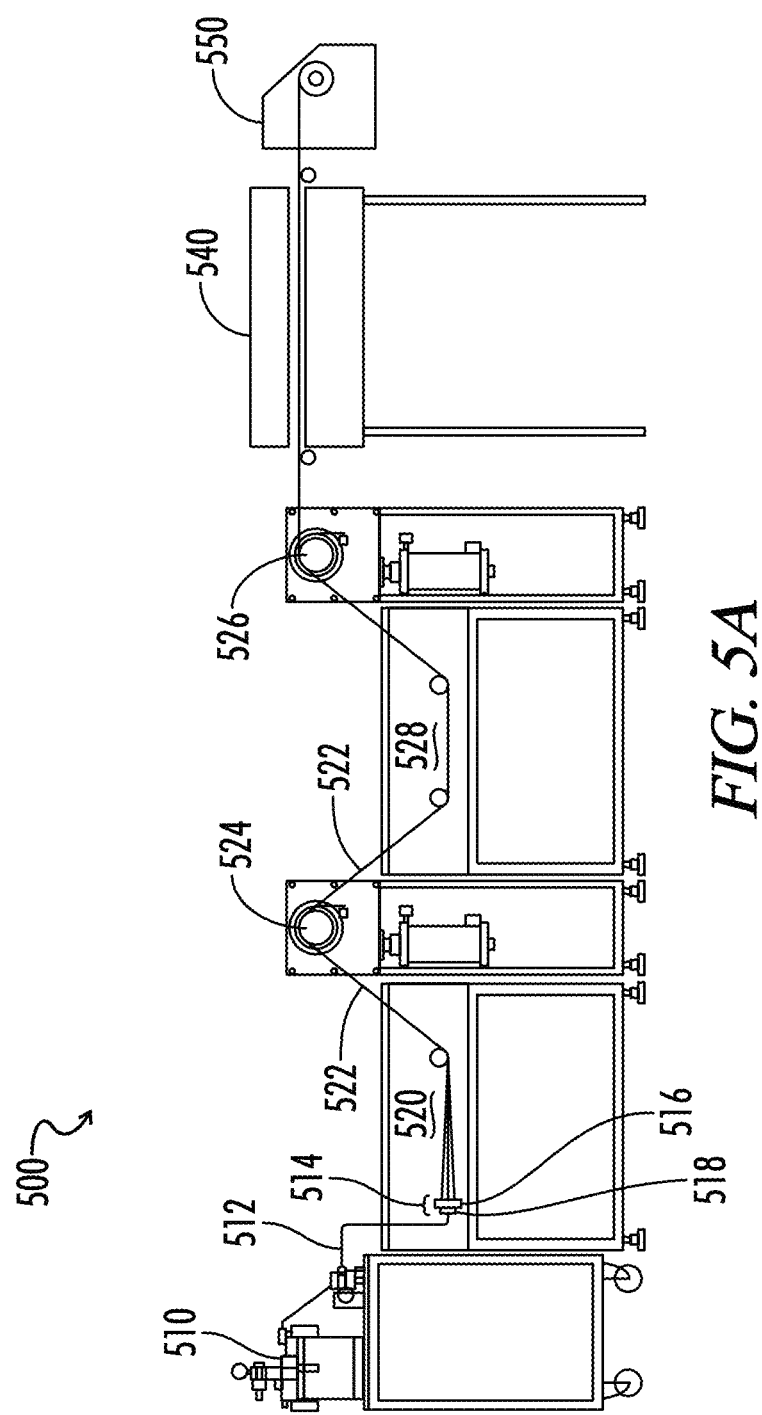
FIG. 5A is a diagram illustrating a fiber spinning machine with wash bath.

FIG. 5A illustrates an exemplary spinning apparatus 500 utilized in creating the IL rayon fibers produced by the methods of the present disclosure. A pressure vessel 510 contains compressed gas which forces the pre-heated admixture from an open container of about one liter (not shown) out through a feed tube 512 at a pressure between about 50 psi and 100 psi, although other pressure ranges may be possible in other embodiments. The feed tube 512 optionally leads directly to the spin die 514 or a spinerette 516 mounted in the spin die 516. A micron pore filter 516 is mounted within the spin die 514 to ensure the particles in the admixture don't plug the holes in the spinerette 516. This is especially important when spinning a large number of fibers. The pressure behind the admixture establishes the extrusion rate which is also approximately the pull rate. The pressure needs to be adjusted (and monitored) during spinning particularly when the filter 516 becomes plugged in order to maintain consistent fiber extrusion rates.

The spin die 514 is submerged in a coagulant bath 520 where the fibers emerge 522 and removal of the ionic liquid solvent by diffusion begins. The admixture is extruded under pressure through the holes into a coagulation bath 520 as continuous, smooth streams of viscous fluid. The admixture enters the coagulation liquid 520 which displaces the ionic liquid solvent, causing the extruded fibers 522 to shrink in volume as the concentration of the cellulose increases. Displacement of the ionic liquid occurs because the coagulant has a higher chemical affinity for the ionic liquid than for the cellulose. The process of removing the ionic liquid from the fiber 522 is affected by the kinetics of diffusion, where the coagulant diffuses into the cellulose fiber 522 while the ionic liquid diffuses out of the fiber 522 radially. In this embodiment, the fiber diameter and the cellulose concentration within the admixture play a key role in the diffusion rate. In one embodiment, the liquid in the coagulation bath 520 is maintained at a temperature between 50° C. and 90° C., although other temperature ranges may be possible in other embodiments.

The IL rayon fiber 522 has a tendency to adhere to other adjacent fibers, regardless of the extrusion pressure and extrusion speed. In an additional embodiment, the liquid within the coagulation bath 520 comprises methanol. The use of methanol prevents the IL rayon fibers 522 from sticking and allows for the simultaneous production of multiple fibers in what is known in the art as a "tow". Sticking fibers at the rayon stage of production makes carbonization ineffective for production of material used in high temperature applications.

Referring again to FIG. 5A, the fiber bundle 522 is pulled through the coagulation bath 522 by the first godet roller 524 spinning at a rate between 1 and 5 m/min. As illustrated in block 240 of FIG. 2, the spun IL rayon fibers are then washed multiple times in order to remove any residual ionic liquid. Here, the fibers 522 are draped over the first godet roller 524 and travel into a wash bath 528 (FIG. 5A). In reference to FIG. 2, the washing step 240 comprises immersion in a hot water bath for a minimum of five minutes for the efficient removal of at least 99% of the ionic liquid. Washing as herein described is effective in reducing the amount of ionic liquid in the fiber to no more than 1% of the final fiber mass. In one embodiment, the temperature of the washing solution is approximately 70° C. to 90° C., although other temperature ranges may be possible in other embodiments.

With reference to FIG. 5A, the fibers 522 are then draped over the second godet roller 526 after the first wash bath 528 such that the speed of the second roller 526 is equal or higher than the first roller 524. In one embodiment, the speed of the second godet 526 is up to 25% faster than the speed of the first godet 524. This difference in speed maintains the fibers 522 in a tight formation and also slightly stretches the fibers 522, aiding in solvent removal.

Figure 5B:
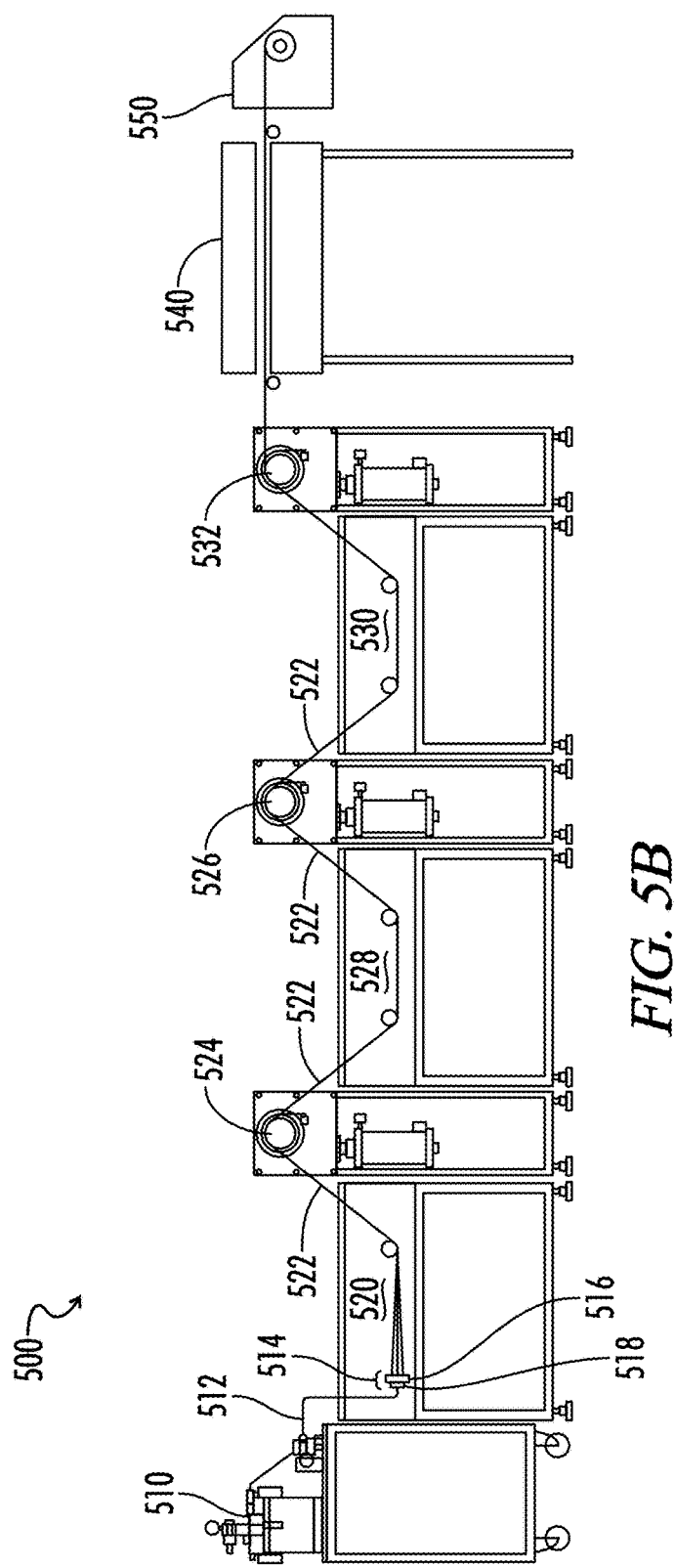
FIG. 5B is a diagram illustrating a fiber spinning machine with two wash baths.

FIG. 5B illustrates an alternate exemplary embodiment of the spinning apparatus 500. The apparatus illustrated in FIG. 5B has similar features to that show in FIG. 5A with the exception of those differences described herein. The apparatus 500 of FIG. 5B includes a second wash bath 530 positioned adjacent to the second godet 526, and a third godet 532 positioned adjacent to the second wash tank 530. The spinning motion of the third godet 532 pulls the fiber 522 through the second wash bath 530 improve the wash efficiency. The spinning apparatus 500 may include additional wash baths in other embodiments. Increased efficiency may also occur by increasing the residence time in the water. The wash tanks and coagulation bath contain heating elements (not shown) to maintain diffusion kinetics.

In the embodiment illustrated in FIG. 2, the volume of the IL rayon fiber decreases as ionic solution solvent is removed from the fiber. For example, an IL rayon fiber produced from an admixture with a 5% cellulose concentration will exhibit an approximate 50% reduction in fiber diameter after coagulation and washing. The final diameter of the fiber is approximately ⅓ the starting orifice diameter after the fiber is dried. An admixture with a 2.4% cellulose concentration will result in a greater reduction in fiber volume.

Referring again to FIGS. 5A and 5B, the fibers 522 then enter a dryer unit 540 after exiting the final wash bath. The dryer unit 540 propels air heated to approximately 80° C. in a laminar fashion upwards as the fibers 522 pass. In one embodiment, auxiliary fans (not shown) may be used to further dry the fibers 522 before spooling. A spooler 550 acts to individually spool each fiber 522 of up to a 10 fiber bundle so that performance testing and property measurements may be completed on single fibers. The speed of the spooler 550 may be adjusted so that it equals the speed of the second godet 526, thus preventing breakage of the fibers 522.

Figure 3A:
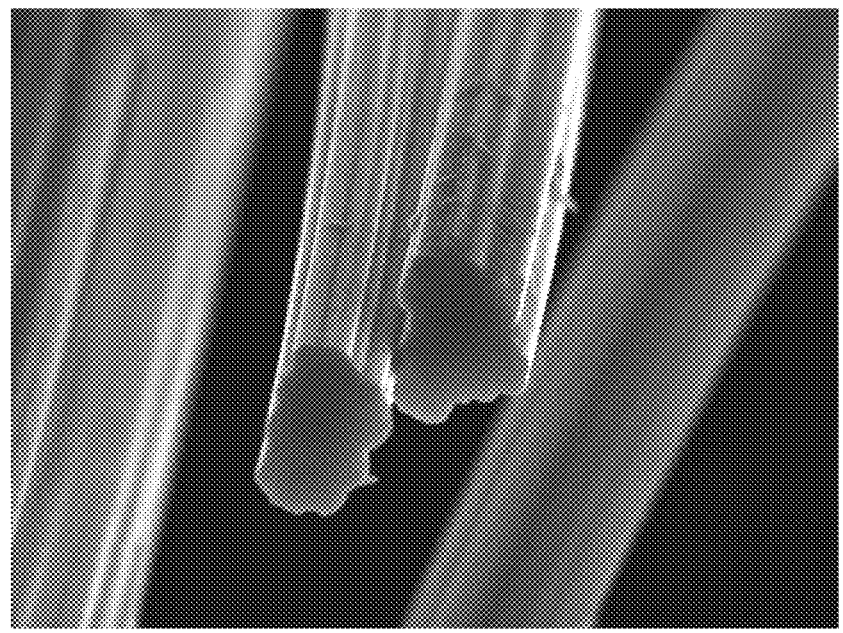
FIG. 3A is a SEM micrograph of viscose rayon illustrating a crenulated cross-section.
Figure 3B:
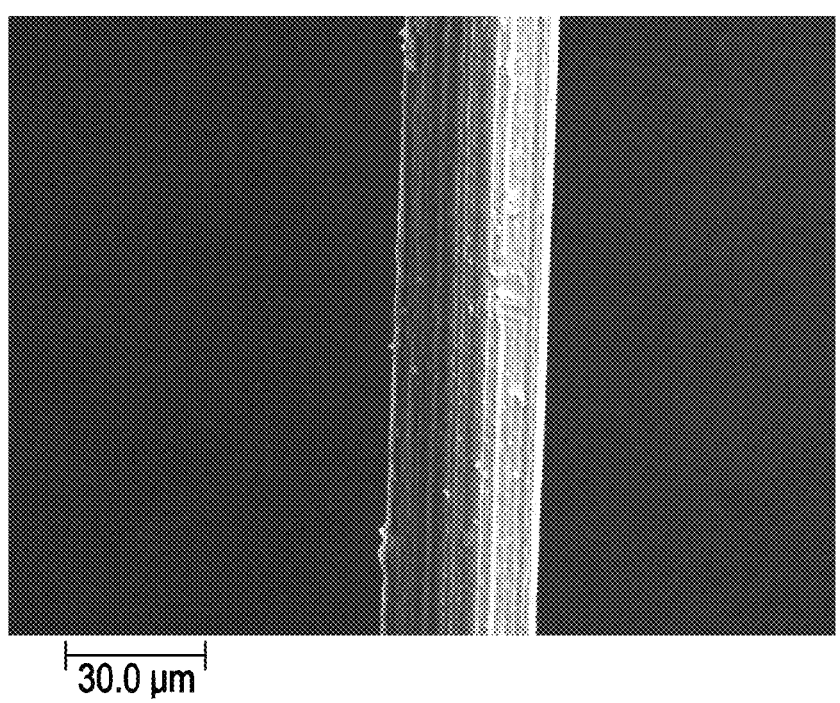
FIG. 3B is a SEM micrograph of ionic liquid processed rayon fiber illustrating moderate crenulation.

In one embodiment, the surface texture of the fibers may be altered by changing the conditions of the spinning process. For example, crenulation results from the rapid radial shrinkage of the fiber during ionic liquid solvent extraction, causing the fiber to partially collapse. The fiber surface may be smooth and or may be moderately crenulated. Viscose rayon fibers were traditionally characterized by strong crenulation. More dilute solutions of cellulose, for example admixtures with a 2.5% cellulose concentration, produce crenulated IL rayon fibers. In contrast, admixtures with a 5% cellulose concentration produce fibers exhibiting a smooth, round in cross section or only a slight degree of crenulation (amounting to longitudinal grooves along the length of the fiber). In this embodiment, the degree of crenulation is controlled by the cellulose concentration and by the spinerette orifice diameter. As an example, FIG. 3A illustrates a scanning electron microscope (SEM) micrograph of commercial viscose rayon showing non-circular cross sections that are described as crenulated. FIG. 3B illustrates a SEM micrograph of ionic liquid processed rayon fiber moderate crenulation. With respect to FIG. 3B, Bmim Cl was used to prepare an admixture containing a concentration of 1.24% cotton linters. It is advantageous for fibers used in the manufacture of rocket nozzles and other materials used in high temperature applications to exhibit some degree of crenulation as it increases the surface contact between the fiber and the surface of the component. The increased surface contact is believed to raise the strength of the composite by allowing more efficient stress transfer from the weaker matrix to the stronger fiber. These high temperature applications require low conductivity of the carbon fiber to reduce ablative erosion and develop an adherent char layer to insulate the underlying composite from direct heat and radiant heat.

Referring again to FIG. 2, block 250 of the exemplary method includes recovery of the ionic liquid from the wash fluid. Increasing pollution, particularly in industrial applications, and the resulting governmental regulations emphasizes a need for more environmentally friendly processes which utilize renewable resources. The cellulose utilized in the presently disclosed admixture is almost completely extracted from the IL rayon fiber during the washing steps of the spinning process. The ionic fluid may be recovered from the aqueous solution and reused by removing the water. This may be accomplished, for example, by evaporating the ionic liquid to dryness. The nearly zero volatility of the ionic liquids and their high temperature stability makes this an efficient recovery process. Evaporation of the aqueous solution results in a minimum recovery rate of approximately 95% of the ionic solution. In an additional embodiment, recovery may reach values of 99%. Other methods of removing the water are possible in other embodiments, for instance reverse osmosis. The ionic liquid is therefore almost completely recyclable.

In an additional embodiment, the IL rayon fiber is then converted to carbon fibers with the proper dimensions, stiffness and thermal conductivity. Referring again to FIG. 2, block 260 includes the carbonization of the IL rayon fibers. This carbonization procedure is illustrated in more detail in FIG. 4. The conversion of rayon fibers into carbon fibers is a three phase thermal process: (1) stabilization (block 300); pyrolization (block 310); and (3) hold anneal and cool down (block 320).

Figure 4:
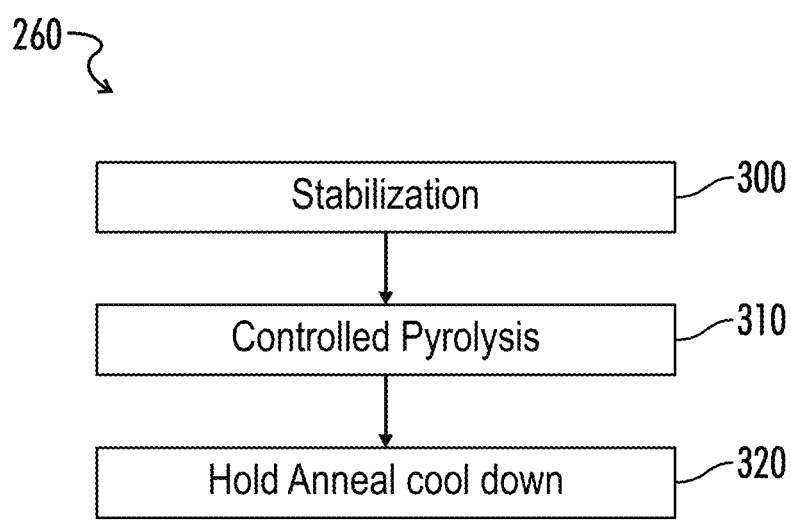
FIG. 4 shows an exemplary flow chart of the carbonization step of FIG. 2.

Referring now to the embodiment illustrated block 300 of FIG. 4, stabilization is defined as an oxidative process that allows the fiber to retain its shape despite being subjected to temperatures which exceed its melting point. In one embodiment, stabilization is performed through contact with atmospheric oxygen, although other gases and catalytic agents may be used in other embodiments. The stabilization process is exothermal. Heating the fibers at a high rate of speed will cause the release of large amounts of exothermal heat, resulting in a reduction of the carbon yield, adherence of adjacent IL rayon fibers and the introduction of voids into the fibers. In one embodiment, the IL rayon fibers are heated in an insulated furnace that is open to atmospheric air, allowing oxygen to come into contact with the fibers. In this embodiment, the fibers are heated to a temperature ranging from about 260° C. to about 300° C. over a period of 65 to 100 hours. Other temperature ranges may be possible in other embodiments. In addition, the time required to heat the fibers may differ in other embodiments. In one embodiment, the heating rate is approximately 3.5° C. to 3.6° C. per hour. Slower heating rates allow oxygen to diffuse into the center of the fiber and thus maintain uniform properties throughout the fiber volume. A heating rate of 0.06 C/min or less is required to maintain Tg>T during the stabilization process and to prevent the fiber from melting or disintegrating.

Referring again to box 300 of FIG. 4, absorbed water exits the IL rayon fiber as the temperature exceeds 120° C., causing dehydration and depolymerization. Dehydration continues to 300° C. and the formation of dehydrocellulose. Depolymerization begins at 250° C., resulting in the formation of levoglucosan. Removal of the water and methanol before the IL rayon fibers are heated to 250° C. reduces levoglucosan formation and thus improves carbon yield. As a result, slow stabilization heating rates improve the final carbon fiber product.

Referring now to box 310 of FIG. 4, the fiber undergoes pyrolysis where it is converted into amorphous carbon. This step 310 must be performed under a protective inert gas atmosphere. The furnace atmosphere must be oxygen-free to part per million levels at this step until the cool-down is completed.

In one embodiment, the pyrolysis step 310 is performed in a nitrogen atmosphere created from the boil-off gas from liquid nitrogen. The gas is directed to the inside of the furnace where the fiber sits in such a way that no opportunity for air or oxygen (such as from water) can enter. In one embodiment, a silicon oil bubbler may be employed to stop air oxygen from entering the furnace as gasses exit. The exiting gas must flow at a low rate of about one half to about 2 liters per minute to fully expel the pyrolysis gasses. The pressure must be great enough to maintain the flow and prevent oxygen from entering the furnace, for instance a positive pressure of about 2 to about 15 psia. Other pressure ranges may be possible in other embodiments.

In an additional embodiment, the furnace temperature is raised to a maximum of between about 1100° C. and 1200° C. over a 72 hour period. Other temperature ranges may be possible in other embodiments. In addition, the time required to heat the fibers may differ in other embodiments. Fibers produced at this temperature range are referred to as "low fired" fibers. In an additional embodiment, the temperature increases at a rate of about 11.3 degrees per hour, although the rate may differ in other embodiments. Adjusting the temperature range and heating rate will result in a carbon fiber with slightly different properties, for instance stiffness and thermal conductivity. Heating the fibers at temperatures over 1200° C. results in fibers that are not suitable for some high temperature applications due to the higher graphitization and resulting higher thermal conductivity. High temperature applications require low thermal conductivity with adequate strength. Heat treatment conditions (i.e., time and temperature) may be altered to engineer the desired properties such as greater stiffness (modulus), greater strength and high thermal conductivity.

In an additional embodiment, the interior surface of the furnace may be lined with a substance which acts to absorb free oxygen. In one embodiment, the furnace is lined with Grafoil, a high temperature paper-like sheet produced from flexible graphite flakes. Other types of oxygen absorbing materials may be used in other embodiments. The oxygen absorbing material gathers any free oxygen before it before it comes into contact with the fibers, resulting in a significantly greater amount of carbon mass associated with the fibers. Prolonging the processes of stabilization and carbonization or pyrolysis prevents damaging kinking of the carbon fibers and increases fiber yield from 22% to 35%. Utilization of slow heating rates results in less stress that may cause kinking, uneven rates of shrinkage and lower strength carbon fibers.

Referring now to block 320 of FIG. 4, the hold and cool down steps comprises maintaining the fiber at the selected maximum temperature for about 1 to 3 hours, although this time period may differ n other embodiments. In one embodiment, this is followed by a cool down step, where the temperature of the fiber is lowered to room temperature. In this embodiment, the cooling process may be rapid but not instantaneous. For example, the fiber may be cooled to room temperature over an approximate 24 hour period, preventing thermal shock of the fiber and of the furnace. In one embodiment, the fiber is cooled at a rate of about 45 degrees per hour. Other temperature rates may be possible in other embodiments.

In an alternative embodiment, water may be added to the ionic liquid for a final concentration of between about 5% and 15% by weight before adding the cellulose material, although other concentrations of water are possible in other embodiments. Addition of the water reduces viscosity, speeds up the mixing process, replaces costly ionic liquids and speeds washing efficiency. The water may be removed by simply heating in the atmospheric air to ensure that the cellulose is completely dissolved. The other steps as illustrated in FIGS. 2 and 4 are identical with the following exceptions: (1) vacuum degassing is not necessary, and (2)

the washing and spinning temperatures are maintained below 100° C. to prevent the formation of voids in the resulting fiber.

In an additional embodiment, the present disclosure pertains to a carbon fiber produced by the methods described herein. The fibers are suitable for high temperature applications, for instance carbon-carbon composite nozzles or phenolic resin-C composite nozzles. In one embodiment, the carbon fiber is manufactured from an IL rayon fiber precursor. These IL rayon carbon fibers have properties similar to those exhibited by fibers produced from viscous rayon (manufactured by North American Rayon Corp., or NARC). Carbon fibers produced using the above described steps are characterized as illustrated in Table

TABLE 1

Properties of carbon fibers produced from IL rayon.

| Parameter | Characterization |
| --- | --- |
| Tensile strength | ~100 ksi; 685 MPa |
| Tensile modulus | ~6 Msi; 41 GPa |
| Thermal conductivity | 3.7 W/m-K |
| Ash content | 0.4 w % |
| Carbon Assay, w % | 96+ |

In an additional embodiment, the carbon fibers produced by the above described methods are characterized by a tensile strength in the range of 310-710 MPa, an elongation at rupture in the range of 0.8-1.5% for 1000° C. fired and 0.7-1.1% for 1100° C. fired carbon fiber, a modulus of elasticity between 25-40 GPa for 1000° C. fired and 30-42 GPa for 1100° C. fired carbon fiber, and a predicted thermal conductivity along the length of the fiber of 3.2-3.5 W/m-K based on fiber electrical resistivity measurements of 38 to 71 µohm-m.

In an additional exemplary embodiment, the present disclosure pertains to a system for producing carbon fiber. In one embodiment, the system includes a pressurized oven. As described above, the pressurized oven is utilized in the conversion of cellulose precursors to IL rayon fibers. In this embodiment, the cellulose precursors are used to create an admixture with an ionic liquid, for example 1-ethyl 3-methylimidazolium acetate (Emim OAc).

The system further includes a fiber spinning apparatus comprising a pressurized vessel fluidly connected to a spinnerrette. The vessel contains compressed gas which forces the admixture from an open container, through a feed tube to a spinerette contained within a spin die. The spin die is submerged in a coagulant bath 520 into which the fibers emerge.

In one embodiment, the system additionally includes at least two wash baths for removing the ionic liquid from the newly formed IL rayon fibers. The fibers are propelled through the coagulation and wash baths by the spinning action of series of godets. In an additional embodiment, the system includes a dryer which propels air heated tonto the fibers to aid in the processing. The system may also include a spooler s to individually spool each fiber so that performance testing and property measurements may be completed on single fibers.

EXPERIMENTAL

Methods

The following equipment was utilized in the described experiment: a pilot-plant scale wet spinning machine with support hardware that includes liquid nitrogen support equipment, a 1500° C. tube furnace for carbonization, a 25 gallon water still, a laboratory microwave to mix solutions and a vacuum oven to dry the materials and remove bubbles. After spinning rayon, the fibers were inserted to the controlled atmosphere furnace and the temperature was increased over a period of week to a 1000-1100° C. and then lowered back to room temperature. The atmosphere utilized was air up to a temperature under 285° C. for stabilization. Carbonization was carried out under an oxygen-free flowing nitrogen atmosphere. Ramp rates, dwell times, and duration at maximum temperature were controlled parameters. After depolymerization and decomposition was complete, a longer dwell at a lower temperature can duplicate the effect of a short term at higher temperatures as these are diffusion controlled processes of a devitrification and crystal growth. Further complications arise when certain impurity atoms or deliberately added compounds catalyze side reactions during decomposition or impact graphite crystal growth.

Test samples were created by extruding individual fiber and determining the morphological behavior of fibers created from wet spinning. During this process cross sections of fiber were observed through different fiber drying schemes. Fibers were mounted and sectioned and polished for metallographic examination. This same procedure was carried out for the carbon fibers. Later, the fibers were examined at high magnification using the scanning electron microscope to view the exterior morphology. Microscopic examination was needed to ensure there were no visible defects, to measure the fiber diameter, to determine the circularity of the cross section, and to evaluate the surface character (rough, glassy, crenulated or ribbed).

Multiple solution percentages were created to determine the most efficient solution of IL/cellulose. A 5% wt. solution was adopted for its viscosity during extrusion. A smaller percentage of cellulose yields a lower viscosity solution but decreases the strength and ability to spin the fiber in a constant spinning process. Viscosity was measured as a function of temperature. Thermo-Gravimetric Analysis (TGA) was performed on the fiber post wet spinning on solutions with varying cellulose concentrations. The experimental fibers were compared to the commercial NARC. The produced IL rayon was always carbonized with a reference piece of the NARC fiber tow.

The test matrix included room temperature tension, fiber diameter, and morphology as measured using electron microscopy, for both rayon and carbon fibers. The tensile properties were measured using a Rheometrics DMTA V at room temperature. Prior to the test, the fiber diameter was measured 5 or more times under high power in an optical microscope. A standard stress-strain curve was obtained from the test. Rayon fibers show mild plastic deformation before fracture while carbon fibers break in a classical brittle manner with no yield. Brittle fracture is a sign that ultimate strengths will vary from sample to sample and skill level of the operator. Usually 5 samples were tested and averaged after any rejections from irregular tests (such as multiple inflections on slope or poor low strain behavior).

Further analysis was performed by taking electrical conductivity measurements of carbonized fiber. A special device allows a precise measurement of the fiber span as the contact is linearly shifted to permit multiple measurements of length. Plotting the resistance as a function of length with constant diameter (measured on microscope) reduces noise by fitting a line to the data. A precision 6 digit 4-point ohm meter was employed for these critical measurements. Sufficiently low AC current was used to prevent self-heating.

The fiber resistance was sufficiently low that the meter impedance was inconsequential.

As a demonstration, multiple attempts to recover the IL from the wash water were attempted. Recovery from wash water yielded ~96% of the IL with little effort. Pans of the water were dried in a low temperature oven overnight.

A hot-stage optical microscope was built to track through the stabilization stage of fiber pyrolysis by fiber color measurements. This was done to learn how the fibers behave and gain insight on why the decomposition temperature was lowered with residues of ionic liquid.

Results and Discussion

Initially Bmim chloride and Emim acetate ionic liquids were used in the production of rayon fibers. The former was corrosive to steel gear pump and there was evidence that the cellulose molecules degraded during storage of the solution over time. The latter posed no such problems partly due to its lower viscosity and melting point.

Although the spinnerets utilized had 10 or 100 holes, most of the work was with respect to single fibers. The spinneret hole sizes were usually 50 and 127 micrometers. Some of the ionic liquid solvent was not completely washed out from the fibers, resulting in some stickiness. The solution to this dilemma was solved by increasing the washing times of the fibers, which also improved cleanliness and other performance attributes. It was also shown that slightly increasing the second godet motor speed and slightly stretching the fibers during the wash cycle improved strength.

SEM and optical transmission microscopy were employed to find and measure defects in the fibers such as voids or porosity, cracking or fibrillation of the fibers, surface roughness and diameter irregularities. This examination was performed for both IL rayon and carbonized fibers. Very few defects were discovered for any of these morphological issues. A few partial diameter voids were found and some porosity caused slight localized bulging of the fiber. The frequency was not considered significant and could be mitigated by reducing gas bubbles in the dope before spinning. Polarized light microscopy of the IL rayon demonstrated that there was some molecular alignment along the length of the fiber.

The use of thermal gravimetric analysis or TGA was selected to monitor the quality of the wash process and of the rayon fibers. Reference samples of Lyocell, NARC and the original cotton linters were tested along with the IL rayon samples. Cotton linters have the highest degradation temperature of the set of samples. Lyocell and NARC degradation temperatures were considerably less. The early ionic liquid rayon fibers had significantly lower degradation temperatures than any of these by ~50° C. It was speculated that increased washing times and temperatures would help remove the ionic liquid from the fiber and cause the degradation temperature to shift to the right. The washing times were increased until the ionic liquid rayon fibers had degradation temperatures close to that of the Lyocell and NARC. This benefited fiber production in several other ways. The IL rayon fibers became stronger as washing times were increased, the fibers did not stick together as much, and the carbon fibers made from these were stronger and lost the dullness of the fiber surfaces that certainly compromised their strength.

During microscopic examination, crenulation of some rayon fibers was found. These are longitudinal ribs along the fiber around the circumferences. Crenulation is the result of the collapse of the fiber as the solvent is extracted during washing. The fiber shrinks in volume after leaving the spinneret hole. Spinning conditions can be tailored to suppress the crenulation and smooth circular rayon fibers have been made, creating shiny, glassy surfaced carbon fibers. Crenulation was enhanced by making more dilute solutions of cellulose in the ionic liquid.

TGA analysis was performed. It was discovered that the onset of degradation identified by TGA was occurring at the same temperature the fiber discoloration appeared. Increasing the wash time of the fiber raised the darkening temperature in the hot-stage as well as the TGA decomposition point. A simple test of the impact of the IL on degradation was performed by taking NARC fibers and soaking them in wash water contaminated by IL. Surprisingly, addition of IL as contamination significantly reduced the decomposition temperature of the NARC.

Viscosity of the dope solution as a function of temperature shows that the solution viscosity is very high even at only 5% concentration. Fortunately, viscosity is always sufficiently high to make fibers even up to 100° C. The wash water should not boil. Prolonged exposure to temperatures above 140° C. caused slow derivitization of the cellulose which reduces its molecular weight and degree of polymerization. A darkening of the solution also occurs accompanied by a caramel smell or burning paper. Rayon fibers made from degraded solutions are less strong but have no influence on the carbon fiber properties after carbonization. Viscosity measurements were made with Brookfield DV III Ultra Programmable Rheometer.

The resistivity measurements verified two significant points: the higher firing temperature of 1100° C. does lower the resistivity from that of 1000° C., and the carbon fibers made through the ionic liquid process fall right in line with the resistivity values of the historic rayon precursor carbon fibers.

Now, therefore, the following is claimed:

1. A method of preparing carbon fiber, comprising:
    mixing a powdered cellulose compound with an ionic fluid to create an ionic fluid admixture;
    degassing the admixture;
    spinning the admixture into ionic liquid (IL) rayon fibers; and
    carbonizing the IL rayon fibers;
    wherein the carbonizing comprises the steps of:
        increasing the temperature of IL rayon fibers from about room temperature to a first temperature between 260° C. and 300° C. over a period of about 65 to 100 hours; and
        increasing the temperature of the IL rayon fibers from the first temperature to a second temperature between 1000° C. and 1200° C. over a period of about 72 hours;
    wherein the mixing and degassing are performed at temperatures under 101° C.

2. The method of claim 1, wherein the concentration of cellulose in the admixture is between 2.4% and 8% w/v.

3. The method of claim 1, wherein the ionic liquid comprises 1-ethyl 3-methylimidazolium acetate.

4. The method of claim 1, wherein the increasing the temperature of the IL rayon fibers to the first temperature comprises increasing the temperature of IL rayon fibers to between 260° C. and 300° C. at a rate of between 3.5° C. to 3.6° C. per hour, and wherein the increasing the temperature of the IL rayon fibers from the first temperature to the second temperature comprises increasing the temperature of the IL rayon fibers at a rate of between 11.2° C. to 11.3° C. per hour.

5. The method of claim 1, wherein the increasing the temperature to the second temperature is performed under a flowing protective inert gas atmosphere.

6. The method of claim 1, wherein the increasing the temperature to the second temperature is performed under a flowing nitrogen atmosphere.

7. The method of claim 1, further comprising the step of decreasing the temperature of the IL rayon fibers from the second temperature to room temperature over a period of about 24 hours.

8. The method of claim 7, wherein the decreasing is performed after maintaining the IL rayon fibers at the second temperature for at least one hour.

9. The method of claim 1, wherein the carbonizing further comprises raising the temperature of the IL rayon fibers to a maximum temperature between 1000° C. and 1200° C.

10. The method of claim 1, further comprising decreasing the temperature of the IL rayon fibers from the second temperature to room temperature at a rate of about 45° C. per hour.

* * * * *